United States Patent Office 3,497,307
Patented Feb. 24, 1970

3,497,307
METHOD OF PREVENTING OXIDATION OF 6-SUBSTITUTED PURINES WITH 4-HYDROXY-1H-PYRAZOLO(3,4-d)PYRIMIDINE AND 4,6 - DIHYDROXY-1H-PYRAZOLO(3,4-d)PYRIMIDINE
George H. Hitchings, Yonkers, and Elvira A. Falco, New Rochelle, N.Y., assignors to Burroughs Wellcome & Co. (U.S.A.), Inc., Tuckahoe, N.Y., a corporation of New York
No Drawing. Continuation-in-part of application Ser. No. 524,873, Feb. 3, 1966. This application Aug. 7, 1967, Ser. No. 658,641
Claims priority, application Great Britain, May 10, 1955, 23,055/55; May 23, 1962, 19,863/62; Aug. 23, 1962, 32,519/62
Int. Cl. A61k 27/00
U.S. Cl. 424—251   4 Claims

ABSTRACT OF THE DISCLOSURE

The method of preventing in a mammal the oxidation of a compound of the Formula I

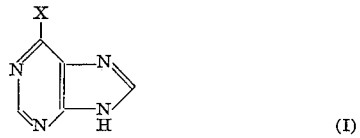

where X is selected from the class consisting of hydrogen, halogen, SH,SR, where R is lower alkyl, NR'R², where R' and R² are selected from the class consisting of hydrogen, alkyl, hydroxyalkyl and arylalkyl, which comprises administering to the mammal an effective amount of a compound of Formula II

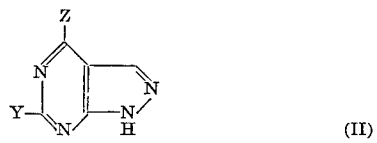

wherein Z is selected from the class consisting of amino and hydroxyl and Y is hydroxyl and, further, may be hydrogen when Z is hydroxyl, and tautomers of these compounds.

---

The present invention relates to the inhibition of the enzyme xanthine oxidase in vivo by a number of pyrazolo(3,4-d)pyrimidines. This application is a continuation in part of applications 574,576 filed Mar. 29, 1956, now abandoned; 22,394 filed Apr. 15, 1960, now abandoned; 221,357 filed Sept. 4, 1962, now abandoned; and 524,873 filed Feb. 3, 1966, now abandoned.

It has been found that certain new pyrazolo(3,4-d)pyrimidines, by reason of their close resemblance in structure to the substrates for the enzyme xanthine oxidase, hypoxanthine (6-hydroxypurine) and xanthine (2,6-dihydroxypurine), are capable of binding to this enzyme and strongly inhibiting its activity.

The compounds of the present invention comprise pyrazolo(3,4-d)pyrimidines of the general formula

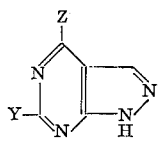

wherein Z is selected from the class consisting of amino or hydroxyl and Y is hydroxyl and, further, may be hydrogen when Z is hydroxyl, and tautomers of these compounds.

A very valuable property of these derivatives and, particularly 4-hydroxy-1H-pyrazolo(3,4-d)pyrimidine, 4-amino-6-hydroxy-1H-pyrazolo(3,4-d)pyrimidine and 4,6-dihydroxy-1H-pyrazolo(3,4-d)pyrimidine, is the inhibition of the systemic enzyme xanthine oxidase in vivo.

This invention, in its broadest terms, is concerned with the inhibition of xanthine oxidase in vivo. Xanthine oxidase is a relatively unspecific enzyme which is rather widely distributed in mammalian tissues. However, the liver and kidney are particularly rich in xanthine oxidase activity. One of the known functions of xanthine oxidase is to catalyze the oxidation of hypoxanthine and xanthine to uric acid. Similarly, metabolic studies have shown that 6-mercaptopurine in the human subject is oxidized to 6-thiouric acid, and 6-chloropurine is oxidized to 6-chloro-2,8-dihydroxypurine by this enzyme. Since 6-mercaptopurine and 6-chloropurine are active as antileukemic agents, while the corresponding uric acids are inactive, the metabolic degradation caused by the action of xanthine oxidase significantly reduces the potential effectiveness of these antimetabolic purines.

The action of xanthine oxidase is involved also in the toxicity of a number of purines. It is known that the limiting factor in the toxicity of adenine (6-aminopurine) is the precipitation of "6-aminouric acid" (2,8-dihydroxyadenine) in the renal tubule. The same mechanism prevails with respect to 6-methylaminopurine and related purine derivatives, the dose of which is limited by the formation and occlusive precipitation of 2,8-dihydroxy-6-methylaminopurine or other purine derivatives in the renal tubules.

Accordingly, this invention discloses in broad terms, a method for preventing the oxidation of 6-substituted purine drugs administered to mammals (i.e. humans, dogs, mice, etc.) in order to increase the activity of the drug or decrease the toxicity of the drug.

The compounds of this invention, namely 4-hydroxy-1H-pyrazolo(3,4-d)pyrimidine; 4,6-dihydroxy-1H-pyrazolo(3,4-d)pyrimidine, and 4-amino-6-hydroxy-1H-pyrazolo(3,4-d)pyrimidine, are administered to the mammal (i.e. humans, dogs, mice, etc.) in conjunction with the administration of the 6-substituted purine drugs in order to prevent the oxidation of the 6-substituted purine drugs (i.e. 6-mercaptopurine, 6-chloropurine, 6-methylaminopurine, 6-propylthiopurine).

The inhibition of oxidation results in a greater effective concentration of the purine drug (in vivo) so that the biological effectiveness of the drug as a tumor growth inhibitor is improved, i.e. 6-mercaptopurine and 6-chloropurine effectiveness is increased.

In cases where the oxidation product of the purine is toxic, e.g. where a purine drug of the Formula II is administered

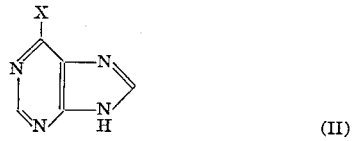

where X is NR'R², where R' and R² are H, alkyl (i.e. lower alkyl), hydroxyalkyl and arylalkyl, inhibition of oxidation also leads to a decreased toxicity of the purine.

Broadly, the drugs which are prevented from being oxidized may be represented by Formula II above, where X is H, halogen, SH,SR (R=lower alkyl), NR'R², where R' or R² is H, alkyl, hydroxy alkyl and arylalkyl.

Specific known drugs, among others for which the activity is increased as the toxicity is decreased, are where X=SH, SCH₃, SC₃H₇, Cl, Br, I, NH₂, NHCH₃, NHC₄H₉, NHC₂H₄OH and NHCH₂C₆H₅.

It is apparent, therefore, that an inhibition of xanthine oxidase activity in vivo is useful in a number of respects:

(1) By reducing the metabolic destruction of a valuable drug, lower doses of the drug can be given or enhanced effects may be obtained from a given dose;

(2) By reducing the formation of an undesired metabolite, the toxicity of a substance may be diminished, or an undesirable effect of the metabolite may be minimized.

The above illustrate but by no means exhaust the list of uses of xanthine oxidase inhibition in vivo.

For use in the treatment of neoplastic and autoimmune diseases, e.g. the leukemias, rheumatoid arthritis and lupus erythematosus, the antimetabolic 6-substituted purine and the xanthine oxidase inhibitor may conveniently be presented as a combined pharmaceutical formulation or, by itself, as the active ingredient of pharmaceutical preparations.

The compounds may thus advantageously be presented in discrete units such as tablets, capsules, cachets, ampules or suppositories, each containing a predetermined amount of xanthine oxidase inhibitor or a combination of 6-substituted purine and xanthine oxidase inhibitor. The active ingredients may also be presented in a powder or granules, as a solution or suspension in an aqueous, non-aqueous or emulsified liquid. For parenteral use, the formulations must be sterile and are presented in sealed containers. The formulations of this invention may be made by any of the methods of pharmacy and may include one or more of the following accessory ingredients: diluents, solutes, buffers, flavoring, binding, dispersing, surface-actives, thickenings, lubricating and coating materials, preservatives, anti-oxidants, bacteriostats, suppository and ointment bases, and other acceptable excipients.

A preferred form is a compressed tablet cointaing 100 mg. of the active ingredient, with about 350 mg. of lactose and suitable granulating and lubricating materials. The daily dosage of 4-hydroxy-1H-pyrazolo(3,4-d)pyrimidine is ordinarily in the range of 50 mg.–900 mg. per dose. The range for the di-substituted compounds (4,6-dihydroxy - 1H - pyrazolo(3,4-d)pyrimidine and 4 - amino-6-hydroxy - 1H - pyrazolo(3,4-d)pyrimidine) is somewhat higher, i.e. 800–1000 mg./day. In some instances, a loading dose about twice the daily dose is desirable. Translated into body-weight, a dosage of about 1 mg./kg.–50 mg./kg. is the preferred dosage for mammals (i.e. humans, dogs, mice, etc.).

The invention will now be described with reference to the following examples, in which all temperatures are given in degrees centigrade.

EXAMPLE 1

Pyrazole-3-4-dicarboxamide

To 7.5 grams of pyrazole-3,4-dicarboxylic acid, there was added 150 ml. of thionyl chloride. This mixture was heated under reflux conditions for ten hours. The thionyl chloride was removed in vacuo and the powdery residue was added, in portions, to a cold, stirred solution of tert-butanol which had been saturated with ammonia at 0°. After the compound had all been added (1 hr.) the mixture was allowed to stand for an additional five hours. The precipitate was then removed and boiled with 100 ml. of concentrated ammonium hydroxide solution (1 hr.). This solution was allowed to evaporate to dryness on the steam bath and the residue crystallized from boiling water. The compound thus obtained formed colorless plates melting with decomposition at 327°.

EXAMPLE 2

4,6-dihydroxy-1H-pyrazolo(3,4-d)pyrimidine

To a cold solution of 16.6 ml. of 0.4 M sodium hypochlorite solution was added (all at once) 500 mg. of pyrazole-3,4-dicarboxamide. The reaction mixture turned pink and then faintly yellow. After standing at 0° for one hour, the reaction mixture was acidified to pH 3 with 2 N hydrochloric acid, and the flocculent precipitate was removed. The compound was recrystallized from boiling water to give colorless needles, in rosettes. The compound does not melt at 320°.

EXAMPLE 3

Preparation of 4-mercapto-6-hydroxy-1H-pyrazolo (3,4-d)pyrimidine

To 4 grams of the 4,6-dihydroxy compound described in Example 2, there was added 12 grams of phosphorus pentasulfide and 60 ml. of dry pyridine. This mixture was heated for three hours at reflux temperature. The pyridine was removed in vacuo and the residue taken up in cold dilute sodium hydroxide solution. On acidification, there was obtained 3.5 g. of a pale yellow compound. This compound, after crystallization from boiling water, formed yellow plates which do not melt at 360°. The compound had the following ultra violet absorption spectrum: at pH 1 the maxima are at 255 and 330 m$\mu$, while at pH 11 the peaks are at 255 and 330 m$\mu$.

EXAMPLE 4

Preparation of the 4,6-dimercapto-1H-pyrazolo (3,4-d)pyrimidine

To the monomercapto compound described in Example 3 (1 g.) there was added 3 g. of phosphorus pentasulfide and 60 ml. of pyridine. This mixture was heated for 16 hours and worked up as described in Example 3. The compound was crystallized from boiling water to give a yellow powder which did not decompose at 320°.

EXAMPLE 5

4-amino-6-hydroxy-1H-pyrazolo(3,4-d)pyrimidine

To 1.5 g. of the 4-mercapto-6-hydroxy compound described above there was added 200 ml. of alcohol saturated with ammonia at 0°. This mixture was heated in a closed vessel for 72 hours at 143°. The bomb contents were allowed to evaporate to dryness and the residue was taken up in cold 1 N hydrochloric acid and precipitated with dilute ammonium hydroxide solution at about pH 7. This was repeated twice more to yield 650 mg. of colorless powder which does not melt at 360°.

EXAMPLE 6

Preparation of 4-dimethylamino-6-hydroxy-1H-pyrazolo(3,4-d)pyrimidine

This compound was prepared from 4-mercapto-6-hydroxy-1H-pyrazolo(3,4-d)pyrimidine in the same manner as the compound described in Example 5, by heating the starting material with an excess of dimethylamino (30% by weight in ethanol) for sixteen hours at 130°. The product crystallized from water in colorless needles.

EXAMPLE 7

Preparation of 4-amino-6-mercapto-1H-pyrazolo (3,4-d)pyrimidine

To 650 mg. of 4,6-dimercapto-1H-pyrazolo(3,4-d)pyrimidine there was added 200 ml. of alcohol (saturated with ammonia at 0°). This mixture was heated in a sealed tube at 149° for 18 hours. The bomb contents were then allowed to evaporate to dryness on the steam bath. The residue was taken up in cold dilute hydrochloric acid solution and reprecipitated by the addition of sodium hydroxide to pH 7. The yield was 400 mg. of a colorless powder which did not melt below 320°.

The ultra-violet absorption spectrum at pH 1 gave maxima at 245, 255 and 295 m$\mu$, while at pH 11 the maxima were at 250, 275 and 290 m$\mu$.

EXAMPLE 8

Preparation of 4-amino-1H-pyrazolo(3,4-d)pyrimidine

To 1.0 gram of the above 4-amino-6-mercapto-1H-pyrazolo(3,4-d)pyrimidine, there was added 20 ml. of concentrated ammonium hydroxide solution, 200 ml. of water and 5 gr. of Raney nickel catalyst. The mixture was heated at reflux temperature for three hours and the solution filtered hot from the Raney nickel. The residual Raney nickel was extracted twice with 100 ml. portions of hot water and filtered. The combined filtrates were concentrated to dryness in vacuo and taken up in 200 ml. of hot ethanol. To the ethanol was added 10 ml. of 33% alcoholic hydrochloric acid and 500 ml. of ether. On standing for 24 hours, rosettes of colorless needles precipitated. These needles were recrystallized from 95% ethanol to give 4-amino-1H-pyrazolo(3,4-d)pyrimidine hydrochloride.

EXAMPLE 9

Preparation of 4-hydroxy-1H-pyrazolo(3,4-d)pyrimidine

One gram of the above amino compound was placed in 100 ml. of 0.2 N sulfuric acid and warmed on the steam bath. To this was added a solution of 1.7 g. of potassium nitrite in 5 ml. of water. The mixture was then boiled for five minutes. The reaction mixture was cooled, brought to pH 5.5 by the addition of ammonium hydroxide solution and concentrated in vacuo to a volume of 20 ml. on standing in the cold for several hours, a precipitate formed which was recrystallized from boiling water to give a colorless powder which did not melt at 320°. This compound is 4-hydroxy-1H-pyrazolo(3,4-d)pyrimidine.

EXAMPLE 10

4-hydroxy-6-methylmercapto-1H-pyrazolo(3,4-d)pyrimidine 8.4 g. of 4-hydroxy-6-mercapto-1H-pyrazolo(3,4-d)pyrimidine was dissolved in 100 ml. of N sodium hydroxide solution and 10 g. methyl iodide was added dropwise with stirring over the course of one hour. The mixture was allowed to stir for an additional two hours at room temperature. After standing overnight, the mixture was acidified with 10 ml. glacial acetic acid. The precipitated product was recovered by filtration. It did not melt when heated (to 320°).

EXAMPLE 11

6-amino-4-hydroxy-1H-pyrazolo(3,4-d)pyrimidine

The above compound (5 g.) was dissolved in 85 ml. concentrated ammonium hydroxide and heated under pressure at 140° for sixteen hours, then cooled. The contents of the bomb were evaporated to dryness; the residue was dissolved in 10 ml. of warm 2 N hydrochloric acid, diluted to 20 ml. and filtered, then treated in the warm with a slight excess of concentrated ammonium hydroxide. The aminohydroxy compound was recovered by filtration, washed and eventually dried at 110°. It did not melt when heated (to 320°).

What is claimed is:

1. The method of preventing in a mammal the oxidation of 6-mercaptopurine which comprises administering to a mammal in conjunction with the administration of 6-mercaptopurine an effective oxidation prevention amount of 4-hydroxy-1H-pyrazolo(3,4-d)pyrimidine.

2. The method according to claim 1 in which the amount of 4-hydroxy-1H-pyrazolo(3,4-d)pyrimidine is 50 mg. to 900 mg.

3. The method of preventing in a mammal the oxidation of 6-mercaptopurine which comprises administering to a mammal in conjunction with the administration of 6-mercaptopurine an effective oxidation prevention amount of 4,6-dihydroxy-1H-pyrazolo(3,4-d)pyrimidine.

4. The method according to claim 3 in which the amount of 4,6-dihydroxy-1H-pyrazolo(3,4-d)pyrimidine is 50 mg to 900 mg.

References Cited

Elion et al., New York Academy of Science Annals, vol. 60, Dec. 6, 1957, pp. 297–303.

Elion et al., Cancer Chemotherapy Reports, Feb. 1962, pp. 197–202.

Lorz et al., Abstracts of Papers, American Chemical Society, 129th meeting, Apr. 8–13, 1959, page 300.

Feigelsow et al., J. of Biological Chemistry, vol. 226, June 1957, pp. 993–1000.

Bragonier et al., P.S.E.B.M., vol. 116, July 1964, pages 685–688.

ALBERT T. MEYERS, Primary Examiner

JEROME D. GOLDBERG, Assistant Examiner